3,213,114
PREPARATION OF QUINONES AND
HYDROQUINONES
Henry G. Braxton, Jr., Birmingham, and Rex D. Closson,
Royal Oak, Mich., assignors to Ethyl Corporation, New
York, N.Y., a corporation of Virginia
No Drawing. Filed June 19, 1962, Ser. No. 203,445
8 Claims. (Cl. 260—396)

This invention relates to a novel chemical process and to an unusual method for preparing hydroquinones. In particular this process relates to a novel preparation of 2,6-dialkylhydroquinone.

Hydroquinones find utility as antioxidants, reducing agents and chemical intermediates. Mixtures of hydroquinones and quinones are useful in photographic processes. In particular, 2,6-dialkyl hydroquinones are useful as antioxidants and as intermediates for the preparation of other beneficial antioxidant material. In the past extensive use of these compounds has been curtailed by their general unavailability and cost of preparation. This is particularly true of 2,6-dialkyl hydroquinones. The preparation of these latter compounds has been accomplished only by involved and indirect routes requiring expensive reagents and starting materials.

One of the problems involved in the preparation of 2,6-dialkyl-p-benzoquinones, the precursors to 2,6-dialkyl hydroquinones, is that oxidation of the commonly available ortho-alkylated materials leads to extensive formation of by-products. Thus, for example, the oxidation of 2,6-di-tert-butylphenol leads primarily to 3,3',5,5',-tetra-tert-butyl-diphenoquinone. Also the oxidation of such commercial compounds as 2,6-di-tert-butyl-4-methylphenol, commonly known in the trade as "Ionol," leads to the formation of extensive amounts of products such as 3,5-di-tert-butyl-p-hydroxybenzaldehyde, 1,2-bis(3,5 - di - tert-butyl-4-hydroxyphenyl)ethane and 3,3',5,5' - tetra - tert-butyl-stilbene-4,4'-quinone. The 2,6-di-tert-butylphenol undergoes a coupling reaction because of the free radical formed by its oxidation. The 2,6-di-tert-butyl-4-methyl-phenol gives rise to large quantities of undesirable side products because of the presence of reactive hydrogen atoms allowing substantial inter-reaction to take place prior to complete oxidation of the para position. Applicants have discovered that by placing, in the para position, a hydrocarbon radical containing a tertiary carbon atom wherein the tertiary carbon atom is attached directly to the phenol ring, oxidation yields the p-benzoquinone as the substantial product. It has further been discovered that the presence of a hydrocarbon radical with a tertiary configuration in the para position is in and of itself not sufficient to allow satisfactory oxidation to the p-benzoquinone. For example, the oxidation of p-tert-butylphenol does not give rise to p-benzoquinone but rather other products are formed. It has now been discovered that the presence of a hydrocarbon radical having a tertiary configuration in both positions ortho to the hydroxyl group as well as in the para position is necessary for the successful, practical oxidation of phenol to the p-benzoquinone.

It is, therefore, an object of this invention to provide a novel and inexpensive method for the preparation of p-benzoquinones. Another object is to provide a novel and inexpensive process for the preparation of 2,6-dialkyl hydroquinones. A further object of this invention is to provide a method for preparing said hydroquinones which does not require expensive equipment or reagents and can be accomplished by a few simple operations with a view to supplying the public with a highly useful chemical material at a cheap price.

The objects of this invention are accomplished by a process for the preparation of a hydroquinone which comprises (A) subjecting a phenol having the formula:

(I) 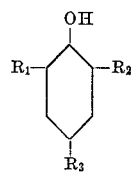

wherein $R_1$, $R_2$ and $R_3$ are hydrocarbon radicals containing a tertiary carbon atom and having from 4 to 12 carbon atoms, such that the tertiary carbon atom is attached directly to the phenol ring, to oxidation in the presence of an oxidation catalyst to form the corresponding benzoquinone and (B) subsequently reducing the benzoquinone to yield the corresponding hydroquinone.

In the above process the configuration and positioning of the substituents on the phenol in step (A) is very important. It is critical that the carbon atoms attached to the phenol ring be tertiary carbon atoms. They should have no hydrogen atoms attached directly thereto but should themselves be attached directly to other carbon atoms. Thus, the substituents can be selected from groups such as tertiary alkyl, benzyl which is disubstituted on the alpha position or other tertiary radicals. Thus, $R_1$, $R_2$ and $R_3$ in the above formula can be any of the tertiary isomeric forms of the alkyl groups having from 4 to about 12 carbon atoms or it can be an alpha disubstituted styrene group.

In conducting step (A) of the above process a wide variety of oxidation catalysts can be used. Such catalysts as platinum sponge, platinum black, colloidal platinum, palladium black, osmium, tellurium, colloidal tellurium, colloidal iridium, gold, silver, copper, gilded asbestos, silver asbestos, copper asbestos, platinized asbestos, reduced cobalt, manganese butyl aluminum turnings, reduced nickel, carbon, metallic oxides such as copper oxide, nickel oxide, cobalt oxide, ferric oxide, chromium sesquioxide, iron sesquioxide, valladium pantoxide, cerium oxide, osmium peroxide, metallic chlorides such as aluminum chloride and copper chloride, manganous salts such as manganese chloride, manganese acetate, manganese butyrate, manganese benzoate and manganese borate, cobalt borate, copper salts such as copper naphthenate, cuprous chloride complexes of such amines as pyridine, N,N,N',N' - tetramethylethylenediamine, phenylenediamine, diethylamine and n-butylamine can be used.

Of the above the cuprous chloride amine catalysts are preferable since they give better yields in less time. Of these, cuprous chloride-pyridine is preferred because it gives the best yields in the least amount of time and in high purity. In using the cuprous chloride amine catalyst, the cuprous chloride and the amine may be merely mixed together to form the catalyst. They can be added separately or together. The molar ratio of amine to cuprous chloride is most advantageously 2:1 but may vary from about 1:1 to about 4:1 without any adverse effects.

In general, the catalyst may be present in from 0.005 to about 3 mole percent based on the phenol. A concentration of 0.85 mole percent catalyst to phenol gives a good yield in satisfactory time for most reactants.

The oxidation step may be conducted with or without a solvent although it is preferred to use a solvent as yields are higher and the reaction process is less involved. When conducting the reaction without a solvent the catalyst is added to the phenol whereupon the mixture is heated until molten and air is passed through the stirred reaction mass until oxidation takes place. The resultant benzoquinone can then be separated and reduced to the hydroquinone or the reduction can be performed without separation.

As noted, a solvent is preferred. Almost any solvent can be used and, indeed, mixtures of different types can be used. Thus, the solvents may be water, primary, secondary and tertiary alcohols such as methanol, ethanol, n-propanol, allyl alcohol, n-butyl alcohol, isobutyl alcohol, secondary butyl alcohol, tert-butyl alcohol, n-amyl alcohol, isoamyl alcohol, tert-amyl alcohol, n-hexyl alcohol, cyclohexanol, n-octyl alcohol, capryl alcohol, n-decyl alcohol, lauryl alcohol, mesityl alcohol, cetyl alcohol, stearo alcohol, benzyl alcohol, n-heptyl alcohol, n-nonyl alcohol, n-undecyl alcohol, n-dodecyl alcohol; glycols such as ethylene glycol, propylene glycol, trimethylene glycol, alpha-butylene glycol, β-butylene glycol, tetramethylene glycol, dimethylethylene glycol, diethylene glycol, triethylene glycol and hexamethylene glycol; polyhydroxy alcohols such as glyceryl, trimethanol propane, pentaerythritol and mannitol and sorbitol; ketones such as acetone, methyl ethyl ketone, methyl-n-propyl ketone, methyl-n-propyl ketone, diethyl ketone, hexanone-2, hexanone-3, methyl-tert-butyl ketone, di-n-propyl ketone, diisopropyl ketone, diisobutyl ketone, di-n-amyl ketone, diacetyl ketone, acetyl acetone, mesityl oxide, phorone, cyclohexanone, n-dioctyl ketone, benzyl phorone and dihexyl ketone; the cyclic ethers such as dioxane or tetrahydrofuran; other ethers such as ethyl ether and propyl ether; ethylene glycol monoalkyl ethers, where the alkyl radicals are methyl, ethyl, n-propyl, isopropyl, n-butyl, isobutyl, tert-butyl, or amyl radicals, any one of the unsaturated aromatic hydrocarbons having from 6 to 12 carbon atoms such as benzene, toulene, xylene and mesitylene; hydroxy-containing aromatic solvents such as phenol, cresol, mesitol, xylenol, catechol and napthol; esters and diesters such as ethyl acetate, propyl acetate, ethyl butyrate and diethyl carbonate; any one of the saturated hydrocarbons having from 5 to 19 carbon atoms such as pentane, hexane, isooctane, dodecane, hexadecane and nonadecane; halogenated hydrocarbons such as chloroform or carbon tetrachloride; organic acids such as acetic acid; and the aliphatic and aromatic primary, secondary and tertiary amines such as propyl amine, butyl amine, hexyl amine, decyl amine, undecyl amine, diethyl amine, diamyl amine, triethyl amine, tributyl amine, toluidine and pyridine; or mixtures of the above.

A preferred solvent is toluene in that it is inexpensive, readily available and allows the process to be conducted smoothly in high yields and in a relatively short time.

The rate of oxidation up to a point is temperature dependent. The temperature used depends on the particular reactants, solvents and geometry of the reaction vessel. In general, temperatures of from −10° to about 250° C. at reaction times of from a few minutes to a week or more are satisfactory. When using higher temperatures pressure may be resorted to. Temperatures of about 25 to 90° C. are quite satisfactory with 70° C. being the optimum temperature for many of the reactants. Preferred reaction times are from 1 to about 8 hours with 6 hours being optimum for many of the reactants.

It has been found that using pressure of up to 1000 p.s.i.g. enhances the yields and reaction times although the oxidation will proceed without pressure. In particular a pressure of 300 p.s.i.g. is preferred. At this pressure, with many solvents, reaction time can be reduced and the hazard of forming an explosive mixture is greatly decreased.

Vacuum may be used to isolate the product such as distillation or stripping the solvent. The product can be isolated by other means as well such as by extraction with organic solvents.

It is preferred that the quinone be vacuum distilled as this eliminates many undesirable side products.

In conducting step (A) of the above process oxygen must be brought into contact with the solution. This may be done by using any oxygen-carrying gas such as oxygen itself or air. A great advantage of the present process is the fact that air can be used thus allowing oxidation to take place under the most economical conditions.

In this respect the air is bubbled through the reaction mass. When using pressure the reaction vessel may be pressurized first with nitrogen until the introduction of air, the pressure then being maintained by air flow.

In conducting the reduction step (B) of this invention the benzoquinone may be separated from the reaction mixture and purified or may be subjected to reduction without separation. It is preferred that the quinone be separated since it is more readily separated from undesirable side products than is the subsequent hydroquinone.

In conducting the reduction it is convenient to employ an alcohol solvent although any of the above-named solvents in the oxidation step may be used. A particularly preferred solvent is isopropanol as it allows reduction in a minimum of time with a minimum of side products and is inexpensive and readily available.

A wide variety of hydrogenation catalysts may be employed in the reduction step of this invention. Examples include palladium chloride on charcoal, activated nickel, nickel-nickel oxide, platinum-platinum oxide, copper chromite, Raney nickel, $Fe_2O_5$, nickel on porcelain, molybdenum oxide, tungsten oxide, nickel sulphide, cobalt sulphide, palladium, nickel-aluminum oxide, nickel on silicon dioxide, platinum black, palladium sponge, lithium aluminum hydroxide, nickel on kaolin, $V_2O_3$, palladium-lead alloy, palladium black; clay, magnesia or zinc oxide containing molybdenum, chromium, vanadium and/or tungsten; activated clay and molybdenum acid, $PtO_2$, Raney copper, copper-aluminum alloy, tin oxide, titanium oxide, chromic oxide, tin sulphide, vanadium sulphide, zinc-nickel alloy, nickel-manganese oxide and the like.

Reduction may also be conducted by means of an oxidation-reduction reaction. Thus, a metal can be used in combination with an acid. For example, zinc or iron and acetic or hydrochloric acid can be used. Also a zinc-copper couple in alcohol, magnesium amalgam in water, zinc dust in combination with an alcoholic alkali such as methanolic sodium hydroxide, zinc dust and ammonium chloride, lithium aluminum hydride alone or in combination with molybdenum pentachloride, titanium tetrachloride, ferric chloride, cuprous chloride or antimony pentachloride, and stannous chloride and hydrochloric acid can be used.

In a preferred embodiment of this invention reduction is accomplished by reacting the benzoquinone with zinc dust and hydrochloric acid as this procedure gives rise to a greater conversion of the benzoquinone with less undesirable by-products.

Examples of phenols that can be used in the process of this invention include: 2,4,6-tri-tert-butylphenol, 2,4-di-tert-amyl-6-tert butylphenol, 2,4,6-tri-(1,1,3,3-tetramethyl-n-butyl)phenol, 2-tert-butyl - 4,6-di-tert-octylphenol, 2,6-di-tert-butyl - 4-(1-ethyl-1-n-propyl-n-amyl)phenol, 2,4,6-tri-tert-octylphenol, 2,4,6-tri-(1,1-dimethyl-n-butyl)phenol, 2,6-di-tert-amyl-4-tert-butylphenol, 2,4,6-tri-(1-ethyl-1-methyl-n-propyl)phenol, 2,4-di-tert-butyl-6-(1,1,3,3 - tetramethyl-n-amyl)phenol, 2-($\alpha,\alpha$-dimethylbenzyl) - 4,6-di-(1,1 - dimethyl-n-nonyl)phenol, 4-tert-butyl-2,6-di-($\alpha,\alpha$-dimethyl-benzyl)phenol, 2-($\alpha,\alpha$-diethylbenzyl)-4,6-di-(1,1-dimethyl-n-amyl)phenol, 2,4,6-tri-(1-ethyl-1 - methyl-n-nonyl)phenol, 2,4,6 - tri-($\alpha,\alpha$-dimethylbenzylphenol), 2,6-di-tert-butyl-4-($\alpha,\alpha$-di - methylbenzyl)-phenol, 2,6-di-tert-butyl-4-($\alpha,\alpha$-diethylbenzyl)phenol and 2,4,6-tri-($\alpha,\alpha$-diethyl-p-methylbenzyl)phenol.

In a preferred embodiment of this invention $R_1$, $R_2$ and $R_3$ of Formula I have structures such that $R_1$ and $R_2$ provide at least as much steric hindrance to their positions of substitution on the phenol ring as does $R_3$. This embodiment is preferred because of the higher yields of 2,6-dialkylphenols produced and the decrease in undesirable by-products. Examples of phenols falling within this embodiment are: 2,4,6-tri-tert-butylphenol, 2,4,6-tri-tert-amylphenol, 2,4,6-tri-(1,1,3,3 - tetramethyl-n-butyl) phenol, 2,6-di-($\alpha,\alpha$-dimethylbenzyl)4-tert - butylphenol, 2,6-di-(1,1,3,3-tetramethyl-n-amyl) - 4-tert-amylphenol, 2,6-di-(α,α-diethylbenzyl) - 4-(1-ethyl-1-methyl-n-propyl) phenol, 2,6-di-(α,α-diethyl-p-methylbenzyl)-4-tert-butyl-phenol, 2,4-di-tert-butyl-6-tert-amylphenol, 2,6-di-tert-octyl-4-(1,1 - dimethyl-n-butyl)phenol, 2,6-di(1-ethyl-1-methyl-n-nonyl)-4-tert-amylphenol, 2,4,6-tri-(1,1-dimethyl-n-nonyl)phenol, 2,6-di-tert - octyl-4-(1,1-dimethyl-n-amyl)phenol, 2,6-di-(α-ethyl-α-methyl - benzyl)-4-tert-butylphenol and 2,6-di-(α,α-diethylbenzyl)-4-(α,α-dimethylbenzyl)phenol.

In a further preferred embodiment of this invention $R_1$, $R_2$ and $R_3$ of Formula I are the same. This embodiment is further preferred because of the higher yields of 2,6-dialkylphenol products, the decrease in undesirable by-products and the ready availability of the starting material. Examples of compounds falling within this preferred embodiment are: 2,4,6-tri-tert-butylphenol, 2,4,6-tri-(1-ethyl-1-methyl-n-propyl)phenol, 2,4,6-tri-(1,1-dimethyl-n-butyl)phenol, 2,4,6-tri-(1,1-dimethyl-n-amyl) phenol, 2,4,6-tri-(1,1,3,3 - tetramethyl-n-butyl)phenol, 2,4,6-tri-(1-ethyl-1-methyl-n-butyl)phenol, 2,4,6-tri-(1,1-diethyl-n-butyl)phenol, 2,4,6 - tri-(1,1-di-ethyl-n-propyl) phenol, 2,4,6-tri-tert-amylphenol, 2,4,6-tri-(α,α-dimethyl-benzyl)phenol, 2,4,6-tri-(1,1,3,3-tetra-methyl-n-amyl)phenol, 2,4,6-tri-(α,α-diethylbenzyl)phenol, 2,4,6-tri-(α,α-di-ethyl-p-methyl-benzyl)phenol, 2,4,6-tri-(1-ethyl-1-methyl-n-nonyl)phenol and 2,4,6-(α,α-diethylbenzyl)phenol.

In the most particularly preferred embodiment of this invention the phenol used is 2,4,6-tri-tert-butylphenol. This embodiment is most particularly preferred because of the ease of oxidation of the phenol, ease of reduction of the resultant benzoquinone and the fact that 2,4,6-tri-tert-butylphenol is readily available at a low cost, being a by-product of a highly commercial process. In U.S. Patent 2,831,898 a process is described whereby phenol is reacted with an olefin in the presence of an aluminum phenoxide catalyst to yield predominantly ortho-substituted phenols. This alkylation process is particaulrly applicable to the preparation of 2,4,6-di-tert-butylphenol which has found wide use as an antioxidant. A substantial by-product of this process is 2,4,6-tri-tert-butylphenol which is produced in 10 to 15 percent yield. Up to now this material has been burned, there being no commercial utility for it. With the process of this invention this by-product can now advantageously be converted into a 2,6-di-tert-butyl hydroquinone which has unique and advantageous properties as an antioxidant and as an intermediate in the synthesis of other highly useful chemicals.

A great advantage of the present invention is that the 2,4,6-tri-tert-butylphenol does not have to be separated out from the other products and by-products of the reaction but rather the still bottoms may be oxidized and the 2,6-di-tert-butyl benzoquinone separated prior to reduction to the corresponding hydroquinone.

The processes of this invention are illustrated by the following examples wherein all parts and percentages are by weight.

Example 1

In a reaction vessel equipped with heating means, stirring means, temperature measuring means, gas inlet and outlet tubes and a compressed air source were placed 13.1 parts of 2,4,6-tri-tert-butylphenol, 0.04 part cuprous chloride and about 0.1 part of N,N,N',N'-tetramethylenediamine. The mixture was heated to dissolve the 2,4,6-tri-tert-butylphenol and air was passed through the stirred reaction mass at a rate of 56 ml./minute for 4.17 hours while the temperature of the reaction mass was held between 94–127° C. The mixture was then subjected to steam distillation. The condensate was collected and extracted with ether. A yellow crystalline mass was obtained on ether evaporation which was shown by vapor phase chromatography to be 2,6-di-tert-butyl - p - benzoquinone which has a melting point of 67–68° C. and a boiling point at 100 mm. of 187.5° C.

Other benzoquinones can be obtained from the oxidation of other tri-tert-alkylated phenols. For example, good results can be obtained when 2,4-di-tert-amyl-6-tert-butylphenol is oxidized as in the above manner in the presence of a platinum black catalyst to yield 2-tert-amyl-6-tert-butyl-p-benzoquinone. Likewise, 2,4,6-tri-(1,1,3,3-tetramethyl-n-butyl)phenol can be oxidized in the presence of reduced cobalt to yield 2,6-di-(1,1,3,3-tetramethyl-n-butyl)-p-benzoquinone. Also, 2-tert-butyl-4,6 - di - tert-octylphenol can be oxidized in the presence of iron sesquioxide to yield 2-tert-butyl-6-tert-octyl-p-benzoquinone. Similarly, 2,6-di-tert-butyl-4-(1-ethyl-1-n-propyl-n - amyl) phenol can be oxidized in the presence of manganese acetate to yield 2,6-di-tert-butyl-p-benzoquinone. Further, 2,6-di-tert-octyl-p-benzoquinone can be obtained upon oxidation of 2,4,6-tri-tert-octylphenol in the presence of a palladium black oxidation catalyst.

Example 2

To a reaction vessel equipped with stirring means and temperature measuring means were placed a solution of 13.2 parts of the 2,6-di-tert-butylbenzoquinone prepared in Example 1 in 44 parts of isopropanol. To this was added dropwise 25 parts of concentrated hydrochloric acid (37 percent) over a 13 minute period. An exothermic reaction caused the temperature to rise to 70° C. This was accompanied by a color change of yellow to red to colorless with some evolution of gas. The reaction mass was cooled to room temperature whereupon a white precipitate separated. Twenty-nine parts of isopropanol were added to dissolve the precipitate. The mixture was filtered to remove the excess zinc and the filtrate added to ice water. Fine white needles precipitated which were collected, dried and identified as 2,6-di-tert-butylhydroquinone by its melting point of 114–116° C.

Other benzoquinones can be similarly reduced to yield the corresponding hydroquinone in a similar manner. thus, 2,6-di-(1,1-dimethyl-n-butyl)-p-benzoquinone can be reduced with lithium aluminum hydride and titanium tetrachloride to yield 2,6-di-(1,1-dimethyl-n-butyl)hydroquinone. Similarly, 2,6-di-tert-amyl hydroquinone can be prepared from the reduction of 2,6-di-tert-amyl-p-benzoquinone with zinc-copper in ethanol. Also, 2,6-di-(1-ethyl-1-methyl-n-propyl) hydroquinone can be prepared from the reduction of 2,6-di-(1-ethyl-1-methyl-n-propyl)-p-benzoquinone with zinc dust and ammonium chloride.

Example 3

Phenol was reacted with isobutylene in the presence of aluminum phenoxide in the manner of U.S. Patent 2,831,898 to yield a mixture of about 75 percent 2,6-di-tert-butylphenol, about 15 percent 2,4,6-tri - tert - butyl-phenol and about 10 percent 2-tert-butylphenol. The 2,6-di-tert-butylphenol and 2-tert-butylphenol were distilled off leaving the 2,4,6-tri-tert-butylphenol in the still bottoms along with small amounts of other by-products (85 percent 2,4,6-tri-tert-butylphenol). In a pressure vessel equipped with a stirrer, heating means, cooling means, temperature measuring means, gas inlet and outlet tubes, nitrogen source and compressed dry air source were placed 914 parts of the still bottoms obtained from the above alkylation. Eight hundred seventy parts of toluene, 2.92 parts of cuprous chloride and 9.31 parts of pyridine were added. The reaction vessel was sealed and charged with nitrogen to 300 p.s.i.g. With the stirrer and heating on, air from the compressed air source was bubbled into the reaction vessel at a pressure of 300 p.s.i.g. The temperature was raised to 68–71° C. and the reaction mass maintained at that temperature with stirring for 6 hours whereupon air flow and heating were discontinued. The reaction mass was stripped of solvent and the solvent-stripped product was distilled at a 10:1 reflux ratio with 2,6-di-tert-butyl-p-benzoquinone being recovered at from 174° C. to about 176° C. at 60 mm. mercury pressure. The 2,6-di-tert-butyl-p-benzoquinone was transferred to a nitrogen-flushed reaction vessel equipped with stirring means, heating and cooling means, temperature measuring means, gas inlet and outlet tubes and a nitrogen source. Also added were 710 parts of azeotropic isopropanol and 198 parts of 90 percent zinc dust. The mixture was heated to 60–70° C. and stirred at that temperature while 420 parts of concentrated hydrochloric acid (37 percent) were added dropwise over a period of one hour. The mixture was then filtered at 50–60° C. The stirred filtrate was washed with water acidified with concentrated hydrochloric acid (total of one percent acid). White solids formed which were filtered off, washed twice with 800 part portions of acidified water and with 700 parts of neat water to yield 2,6-di-tert-butyl hydroquinone with a melting point of 112–115° C.

Good results can be obtained when other tri-tert-alkylated phenols are similarly treated. For example, 2,4-di-tert-butyl-6-(1,1,3,3-tetramethyl-n-amyl)phenol can be oxidized to form 2-tert-butyl-6-(1,1,3,3-tetramethyl-n-amyl)-p-benzoquinone which, in turn, can be reduced to yield 2-tert-butyl-6-(1,1,3,3-tetramethyl-n-amyl)hydroquinone. Likewise, 2-($\alpha,\alpha$-dimethylbenzyl)-4,6-di-(1,1-dimethyl-n-nonyl)phenol can be subject to oxidation followed by reduction to yield 2-($\alpha,\alpha$-dimethylbenzyl)-6-(1,1-dimethyl-n-nonyl)hydroquinone. Also, 2,6-di-($\alpha,\alpha$-dimethylbenzyl) hydroquinone can be obtained from the reduction of the benzoquinone formed from the oxidation of 4-tert-butyl-2,6-di-($\alpha,\alpha$-dimethylbenzyl)phenol.

*Example 4*

In a reaction vessel equipped with heating and cooling means, stirring means, temperature measuring means, gas inlet and outlet tubes and compressed dry air source are placed 346 parts of 2,4,6-tri-(1-ethyl-1-methyl-n-propyl)-phenol in 200 parts of n-hexane and 1.76 grams of reduced nickel. The temperature is lowered to —10° C. and air is bubbled through the reaction mass for one week. The reaction mass is then stripped of solvent. Two hundred parts of acetic acid and 60 parts of iron powder are added. The mixture is heated to 80° C. for 4 hours, cooled and filtered. It is washed with water, acidified with one percent hydrochloric acid whereupon a precipitate formed which is filtered and washed with water to yield 2,6-di-(1-ethyl-1-methyl-n-propyl) hydroquinone.

Good results are also obtained when other phenols are treated in the above manner. For example, 2-($\alpha,\alpha$-diethylbenzyl)-4,6-di-(1,1-dimethyl-n-amyl)phenol can be obtained and then reduced to form 2-($\alpha,\alpha$-diethylbenzyl)-6-(1,1-dimethyl-n-amyl) hydroquinone. Similarly, 2,4,6-tri-(1-ethyl-1-methyl-n-nonyl) can be oxidized and subsequently reduced to yield 2,6-di-(1-ethyl-1-methyl-n-nonyl)hydroquinone. Also 2,4,6-tri-($\alpha,\alpha$-dimethylbenzyl)phenol can be oxidized to form 2,6-di-($\alpha,\alpha$-dimethylbenzyl)-p-benzoquinone which can then be reduced to yield 2,6-di-($\alpha,\alpha$-dimethylbenzyl)hydroquinone.

*Example 5*

In a pressure vessel equipped with a stirrer, heating and cooling means, temperature measuring means, gas inlet and outlet tubes, nitrogen source and compressed dry air source are placed 493 parts of 2,4,6-tri-($\alpha$-ethyl-$\alpha$-methylbenzyl)phenol in 450 parts of n-propyl alcohol and 2.0 grams of aluminum chloride. The vessel is pressurized to 1000 p.s.i.g. with nitrogen and air is passed through the reaction mass at a rate sufficient to maintain the pressure at 1000 p.s.i.g. The temperature is maintained at 25° C. with stirring and air flow for 8 hours whereupon the pressure is released. Sixty parts of iron powder are added and the temperature is raised to 60° C. One hundred fifty parts of 37 percent hydrochloric acid are then added dropwise over a period of 2 hours. The mixture is filtered and the filtrate washed with water whereupon a precipitate forms which is filtered and washed with water to yield 2,6-di-($\alpha$-ethyl-$\alpha$-methylbenzyl) hydroquinone.

Good results are also obtained when other tri-tert-alkylated phenols are similarly treated. For example, 2,6-di-tert-butyl-4-($\alpha,\alpha$-dimethylbenzyl)phenol can be oxidized and then subsequently reduced to yield 2,6-di-tert-butyl hydroquinone. Likewise, 2,4-di-tert-butyl-6-($\alpha,\alpha$-diethylbenzyl)phenol can be oxidized and subsequently reduced to yield 2-tert-butyl-6-($\alpha,\alpha$-diethylbenzyl) hydroquinone. Also, 2,4,6-tri-($\alpha,\alpha$-diethyl-p-methylbenzyl)-phenol can be oxidized and then reduced to yield 2,6-di-($\alpha,\alpha$-diethyl-p-methylbenzyl) hydroquinone. Similarly, 2,4,6-tri-tert-amylphenol can be oxidized and then reduced to yield 2,6-di-tert-amyl hydroquinone.

*Example 6*

In the pressure vessel of Example 5 are placed 290 parts of 2,6-di-tert-amyl-4-tert-butylphenol in 400 parts of isooctane, 0.10 gram of cuprous chloride and 0.072 part of ethylene diamine. The vessel is pressurized to 500 p.s.i.g. with nitrogen and air is passed through the reaction mass at a rate sufficient to maintain the pressure at 500 p.s.i.g. The reaction mass is stirred and heated to 90° C. and kept at that temperature with stirring and air flow for one hour whereupon the pressure is released. The reaction mass is stripped of solvent and the solvent-stripped product distilled to yield 2,6-di-tert-amyl-p-benzoquinone. This material is placed in a pressure vessel equipped with heating means, stirring means, gas inlet and outlet tubes and nitrogen and hydrogen sources. Three and three tenths parts of Raney nickel and 260 parts of toluene are added. The vessel is flushed with nitrogen and then pressurized with 1000 p.s.i.g. of hydrogen. The mixture is stirred while the temperature is slowly raised to 170° C. and held there for 3 hours. The resultant mixture is filtered and the filtrate washed with water whereupon a precipitate forms which is filtered and washed with water to yield 2,6-di-tert-amyl hydroquinone.

Good results are also obtained when other tri-tert-alkylated phenols are reacted in a similar manner. For example, 2,6-di-($\alpha,\alpha$-dimethylbenzyl)-4-tert-butylphenol can be oxidized and subsequently hydrogenated to yield 2,6-di-($\alpha,\alpha$-dimethylbenzyl)hydroquinone. Likewise, 2,6-di-(1,1,3,3-tetramethyl-n-amyl-4-tert-amyl)phenol can be oxidized to form 2,6-di-(1,1,3,3-tetramethyl-n-amyl)-p-benzoquinone which can then be hydrogenated to yield 2,6-di-(1,1,3,3-tetramethyl-n-amyl)hydroquinone. Also, 2,6-di-($\alpha,\alpha$-diethylbenzyl)-4-(1-ethyl-1-methyl-n-propyl) phenol can be oxidized and then hydrogenated to yield 2,6-di-($\alpha,\alpha$-diethylbenzyl)hydroquinone.

*Example 7*

In the pressure vessel of Example 5 are placed 374 parts of 2-tert-octyl-4,6-di-(1,1-dimethyl-n-butyl)phenol in 400 parts of hexadecane and .01 part of platinum black. The vessel is pressured to 100 p.s.i.g. with nitrogen and air is passed through the reaction mass at a rate sufficient to maintain the pressure at 100 p.s.i.g. The temperature is raised to 250° C. and maintained there with stirring and air flow for a few minutes whereupon the pressure is released. Two hundred parts of stannous chloride are added and the temperature is raised to 80° C. One hundred sixty parts of 37 percent hydrochloric acid are then added dropwise over a period of one hour. The mixture is filtered and the filtrate washed with water whereupon a precipitate forms which is filtered and washed with water to yield 2-tert-octyl-6-(1,1-dimethyl-n-butyl) hydroquinone.

Good results are also obtained when other tri-tert-alkylated phenols are reacted in a similar manner. Thus, 2,4-di-($\alpha,\alpha$-diethylbenzyl)-6-($\alpha,\alpha$-dimethylbenzyl)phenol can be oxidized and subsequently reduced to yield 2-($\alpha,\alpha$-diethylbenzyl)-6-($\alpha,\alpha$-dimethylbenzyl)hydroquinone. Similarly, 2,6-di-tert-octyl-4-(1,1-dimethyl-n-amyl) phenol can be oxidized to form 2,6-di-tert-octyl-p-benzoquinone which can then be reduced to yield 2,6-di-tert-octyl hydroquinone. Likewise, 2,6-di-(1-ethyl-1-methyl-n-nonyl) 4-tert amylphenol can be oxidized and subsequently reduced to yield 2,6-di-(1-ethyl-1-methyl-n-nonyl)hydroquinone.

We claim:

1. A process for preparing a para-benzoquinone which comprises contacting a phenol having the formula:

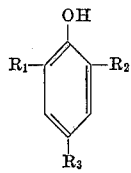

wherein $R_1$, $R_2$ and $R_3$ are hydrocarbon radicals containing a tertiary carbon atom and having from 4 to 12 carbon atoms, such that said tertiary carbon atom is attached directly to the phenol ring, with oxygen and an oxidation catalyst to form the corresponding benzoquinone.

2. The process of claim 1 wherein said phenol is 2,4,6-tri-tert-butylphenol.

3. The process of claim 2 wherein said oxidation is conducted at a temperature of from −10 to 250° C. at superatmospheric pressure of up to 1000 p.s.i.g.

4. The process of claim 3 wherein said oxidation catalyst is cuprous-chloride-pyridine.

5. A process for preparing 2,6-di-tert-butyl-para-benzoquinone, said process comprising the steps of (A) reacting phenol with iso-butylene in the presence of an aluminum phenoxide catalyst to form a mixture consisting essentially of 2,6-di-tert-butylphenol and containing a substantial amount of 2,4,6-tri-tert-butylphenol; (B) distilling from said mixture said 2,6-di-tert-butylphenol, leaving still bottoms containing a substantial amount of 2,4,6-tri-tert-butylphenol; and (C) contacting said still bottoms with oxygen and an oxidation catalyst to form 2,6-di-tert-butyl-para-benzoquinone.

6. A process for preparing a para-hydroquinone which comprises (A) contacting a phenol having the formula:

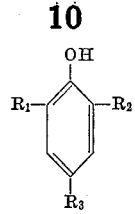

wherein $R_1$, $R_2$ and $R_3$ are hydrocarbon radicals containing a tertiary carbon atom and having from 4 to 12 carbon atoms such that said tertiary carbon atom is attached directly to the phenol ring, with oxygen and of an oxidation catalyst to form the corresponding benzoquinone and (B) subsequently reducing said benzoquinone to yield the corresponding hydroquinone.

7. A process for preparing a para-hydroquinone which comprises (A) contacting 2,4,6-tri-tert-butylphenol with oxygen and a cuprous chloride-pyridine oxidation catalyst at a temperature of from −10 to 250° C. at superatmospheric pressure of up to 1000 p.s.i.g. to form the corresponding benzoquinone, and (B) subsequently reducing said benzoquinone with zinc and hydrochloric acid.

8. A process for preparing 2,6-di-tert-butyl-para-hydroquinone, said process comprising the steps of (A) contacting 2,4,6-tri-tert-butylphenol with oxygen and a cuprous chloride-pyridine complex to form 2,6-di-tert-butyl-para-benzoquinone, and (B) contacting said 2,6-di-tert-butyl-para-benzoquinone with hydrogen and a Raney nickel catalyst to yield 2,6-di-tert-butyl-para-hydroquinone.

References Cited by the Examiner

UNITED STATES PATENTS 2,657,222   10/53   Allen et al. _____ 260—396

OTHER REFERENCES

Kharasch et al.: "J. Org. Chem.," vol. 22, pp. 1439–43 (1957).

Yohe et al.: "J. Org. Chem.," vol. 21, pp. 1289–1292 (1956).

LORRAINE A. WEINBERGER, *Primary Examiner.*

IRVING MARCUS, LEON ZITVER, *Examiners..*